United States Patent [19]
Ilin et al.

[11] 3,948,780
[45] Apr. 6, 1976

[54] CENTRIFUGE FOR SEPARATION OF SUSPENSIONS

[76] Inventors: Mikhail Ivanovich Ilin, ulitsa Sadovaya, 214, kv. 5; Gennady Mikhailovich Chudakov, ulitsa Krasnaya, 35, kv. 10, both of Krasnodar; Valery Alexandrovich Trofimov, ulitsa Kirova, 67, kv, 25; Alexandr Ivanovich Boitsov, prospekt Pobedy, 91, kv. 60, Penza; Serafim Vladimirovich Danilin, ulitsa Ordzhonikidze, 8, Krasnodar, all of U.S.S.R.

[22] Filed: Apr. 22, 1975

[21] Appl. No.: 570,423

[52] U.S. Cl. .............................. 210/380 R
[51] Int. Cl.² ........................... B01D 33/02
[58] Field of Search ............. 210/380, 381, 360

[56] References Cited
UNITED STATES PATENTS

| 1,474,845 | 11/1923 | Barr | 210/380 X |
| 1,628,321 | 5/1927 | Lchky | 210/380 X |
| 2,639,811 | 5/1953 | Sando et al. | 210/381 X |
| 3,207,627 | 9/1965 | Dietzel et al. | 210/380 X |

*Primary Examiner*—John Adee
*Attorney, Agent, or Firm*—Steinberg & Blake

[57] ABSTRACT

A centrifuge for the separation of suspensions comprising a casing which accommodates a rotor with arc-shaped vanes. Each vane consists of a fluted body pressed to the bottom of which is a sieve with flat projections arranged one after another along the flow of the suspension. Each projection extends from one side surface of the sieve to the other. At the inlet end of the vane the sieve is fastened to the body by a strip curved in the shape of a clamp. The bottom of the vane body may be corrugated.

The centrifuge of this design ensures a more efficient separation of suspension as compared with the similar known centrifuges, it is more reliable in operation and convenient in servicing.

9 Claims, 6 Drawing Figures

CENTRIFUGE FOR SEPARATION OF SUSPENSIONS

The present invention relates to centrifuges for the separation of suspensions, preferably massecuite used in food industry. Such a centrifuge can also be sucsessfully used in chemical industry and for concentration of minerals.

The improvement of the centrifuge is aimed at raising the efficiency of separation of suspensions into solid and liquid phases, and at improving the reliability of the centrifuge and facilitating replacement of the wearing parts of the rotor vanes.

At present, suspensions are separated in centrifuges whose casing is provided with special devices for loading the suspension and separate unloading of the centrifugate and sludge. The drive shaft accommodated in the casing carries a rotor with arc-shaped vanes arranged side by side in a ring, each vane being located between the bottom and cover of the rotor and facing them with its side surfaces.

Each vane consists of a fluted body with a sieve which is pressed against said body longitudinally by strips. The inlet end of each vane is curved to form an eye which fits over a pin secured in the bottom and cover of the rotor at the point where the suspension is delivered into the centrifuge rotor.

The inlet end of each vane rests on the rotor shell which has a hole for unloading the sludge at the outlet end of each vane whereas the rotor bottom has holes for the discharge of the centrifugate.

The surface of the sieve over which the suspension moves is smooth and has a constant or gradually changing curvature.

In the known centrifuges the sieve is fastened to the vane body by a variety of methods.

In some centrifuges the sieve is fastened by screws to the vane body at the inlet end of the vane.

Besides, the sieve is pressed by strips against the vane body. Said strips are located on the sides of the vane body, being fastened by bolts or screws.

In other centrifuges the sieve is fastened by an eye which is formed by curving the bottom of the vane body at the inlet end of the vane. A pin with the edge of the sieve coiled around it is inserted into this eye while the sides of the sieve are pressed against the body bottom by longitudinal strips rigidly secured to the body walls. The outer surface of said eye merges smoothly with the nonworking side of the vane body bottom. The working side of the vane body bottom which supports the sieve and over which the centrifugate flows has flutes directed along the vane, the nonworking side of the bottom being flat.

In another type of centrifuges each vane of the rotor is fastened between its bottom and cover so that the inlet end of this vane is slipped on a pin while the outlet end rests on the rotor shell. In other centrifuges the vanes are secured only by pins or rest on each other and all of them together rest on the shell.

In the centrifuges with a smooth surface of the sieve and a constant or gradually changing curvature the movement of the layer of the treated suspension over the sieve is insufficiently stable which means that the suspension drops off the vane or its velocity is sharply decreased (the so-called jamming). Besides, the properties of the suspension change with its temperature, viscosity and the size of the sludge particles, all this changing the coefficient of friction between the suspension and the sieve. As a result, the layer of the suspension moves either at an excessively high speed over the entire length of the sieve, or slows down and stops. The former event leads to an unsatisfactory separation of the suspension, namely an excessive moisture content in the sludge, whereas the latter reduces the centrifuge output.

When the layer of the suspension moves uniformly over the sieve, the distance between the particles and their bonds are not weakened which impairs the efficiency of separation of the suspension.

In the known centrifuges the various types of sieve fastening interfere with rapid replacement of a worn sieve in the vane because it takes time to remove and install the screws which hold the sieve and the longitudinal strips.

Smooth blending of the outer surface of the eye with the nonworking back side of the vane body bottom causes the liquid contained in the suspension to wet the nonworking flat side of the vane body bottom due to the forces of adhesion; this liquid flows over the flat side of the vane body bottom and mixes with the sludge at the outlet end of the vane which is objectionable since it raises the moisture content of the sludge separated from the suspension.

Besides, too much metal is wasted for making the bottom of the vane body which increases unduly the weight of the vane body, the loads applied to the vane and rotor by centrifugal forces and, eventually, impairs the reliability of the centrifuge.

The inlet end of the vanes is fastened by hollow pins of a considerable diameter which brings about an undesirable reduction in the number of vanes installed on the rotor.

If the vanes rest on each other and on the rotor shell, it becomes possible to install a large number of vanes in the rotor but it involves a danger of shell failure under the forces of vane pressure.

To counter such a contingency, the shells are reinforced by rings but this fails to solve the problem since the rings have a considerable mass and, during rotation of the rotor, are subjected to breaking stresses caused by centrifugal forces. This denies the possibility of raising the speed of the rotor and, consequently, the output of the centrifuge.

In connection with ever-growing volume of suspensions to be treated, it has become necessary to replace promptly the worn parts of the centrifuge rotor. Besides, the requirements for the quality of the products obtained by centrifuging suspensions become more exacting.

The known designs of centrifuges fail to satisfy these requirements and cannot solve the problem; this has led to an urgent need for improving the centrifuges and eliminating the above-listed disadvantages.

The main object of the invention lies in providing a centrifuge for the separation of suspensions which would prove more efficient in separating the treated suspension compared with the known centrifuges of a similar type.

Another no less important object of the invention lies is stepping up the reliability of the centrifuge and convenience of its servicing.

These and other objects of the invention are accomplished by providing a centrifuge for the separation of suspensions which comprises a rotor mounted on a drive shaft in a casing, said rotor being provided with arc-shaped vanes which are arranged side by side in a ring, are located, each, between the bottom and cover of the rotor and face them by their side surfaces; each vane consists of a fluted body with a sieve pressed longitudinally against said body by strips, the inlet end of each vane being curved into an eye and slipped over a pin which is secured in the bottom and cover of the rotor at the point where the suspension is fed in, whereas the outlet end of each vane rests on the rotor shell which has a hole for the discharge of the sludge at the outlet end of the vane and the rotor bottom has a hole for the discharge of the centrifugate wherein, according to the invention, the sieve of each vane has flat projections arranged one after another in the direction of suspension flow and extending from one side of the sieve to the other.

The projections on the surface of the vane sieve ensure stable movement of the treated suspension along the sieve without dropping off and jamming in case of a sudden change in the coefficient of friction between the suspension and the sieve.

If this coefficient of friction diminishes, the flat projections prevent the dropping off (slipping) of the nonseparated suspension from the vane; on the contrary, when the coefficient of friction increases, the accumulating layer of suspension forces the preceding layer to move over the flat projections since there is always a possibility of relative movement between the individual layers and particles of the suspension being treated. This improves the process of separation.

Besides, as the suspension moves over the flat projections, the solid particles turn relative to the vector of the centrifugal force which improves the separation of liquid from the surface of the solid particies.

The height of the flat projections can vary from 5 to 10 mm which is preferable for the treatment of massecuite.

Each flat projection can have the form of a portion of the sieve curved at an angle. This is the simplest technological method of making flat projections.

It is desirable that the flat projections located in the middle of the sieve should be made in the form of angles whose ends can be pressed down at the sides of the sieve by strips; said strips can be fastened to the wall of the vane body by a finge at one end and by a catch at the other.

Such a method of fastening the projections to the vane sieve will speed up and facilitate their replacement.

It is practicable that the sieve should be curved in the vane in the plane of rotor rotation along a zig-zag line an that each flat projection should be located along the flow of the suspension at the end of the corresponding straight portion of the zig-zag line.

This shape of the vane sieve ensures fast movement of the layer of suspension on each straight portion of the zig-zag line thereby breaking up the solid structure of the suspension layer and improving the separation of the liquid (centrifugate) from the solid particles (sludge).

Owing to the flat projections the mean velocity of the suspension layer along the length of the vane remains constant, changing only on individual portions of the zig-zag line.

The bottom of the fluted vane body can be corrugated, the corrugations being located longitudinally along the vane under the sieve.

Such a bottom of the vane body forms longitudinal grooves under the sieve for the flow of the centrifugate while the protruding ribs of the corrugations support the sieve. Besides, the vane with such a bottom requires less metal than the known vanes, is lighter so that the vane and the rotor are subjected to lighter stresses caused by the centrifugal forces.

It is no less practicable that the outer side surfaces of the fluted body of the vane should be provided with at least one projection and the surfaces of the rotor bottom and cover facing each other should be provided with the corresponding number of circular grooves for these projections, made coaxially with the axis of rotor rotation.

These projections serve as an additional support for each vane which allows the pins fastening the inlet end of the vane to be made comparatively thin.

Besides, the projections on the side surfaces of the vanes do not occupy any place between the vanes, therefore the number of vanes in the rotor can be increased.

The nonseparated suspension enters the inlet portion of the vane which is therefore subjected to a certain load.

It is impossible to install pins for supporting the vane at its beginning and middle owing to the absence of sufficient space; the side projections eliminate this difficulty.

It is desirable that a pin should be installed at the outer side of the vane body bottom in the immediate proximity to the outlet portion of the vane, and the ends of the pin should be fastened in the rotor bottom and cover.

Each pin is an additional support for the vane, protecting it from breaking. Simultaneously, the pins serve for fastening the rotor cover and bottom. The outlet end of each vane rests on the shell as it is done in the known designs. However, each vane in the centrifuge according to the invention is a multiple-support beam resting on at least four points, so that only a small force of pressure is transmitted from each vane to the shell. This makes it possible to dispense with the shell-reinforcing rings and to increase the angular velocity of the rotor.

It is possible to provide the inlet end of the vane along its entire width with a clamp-shaped metal strip for pressing down the sieve, the side ends of the strip being bent in opposite directions from each other and arranged in the plane of the clamp.

The bent end of the clamp located at the side of the vane sieve ensures the spreading of the suspension delivered to the vane over the entire surface of its sieve. The other bent end of the clamp at the outer side of the vane bottom prevents the flow of liquid over the nonworking side of the vane body its penetration into the dehydrated sludge.

Thus the above-quoted improvements in the centrifuge step up the efficiency of separation of the suspension, ensure its reliability and ease of servicing.

The invention will become more apparent from the accompanying drawings, in which.

Figure 1:
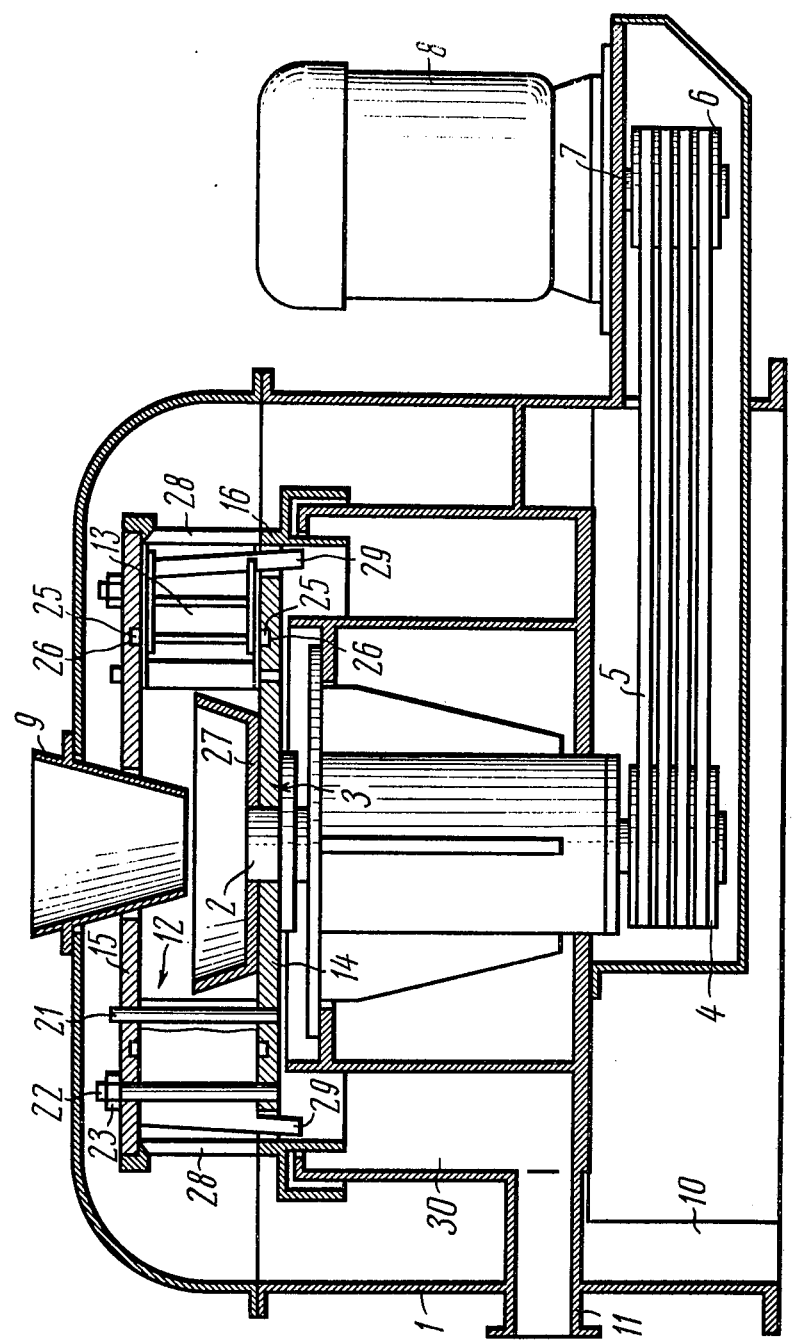
FIG. 1 shows the centrifuge with a partial section along the longitudinal axis of the rotor shaft, with a cutout.

The centrifuge for the separation of suspensions has a hollow casing 1 (FIG. 1) accommodating a rotor 3 whose bottom is secured on a vertical or horizontal drive shaft 2.

The drive shaft 2 is mounted in bearings (not shown in the drawing).

The rotor is rotated by a pulley 4 installed on the lower end of the vertical drive shaft 2 and connected by belts 5 with a pulley 6 secured on the shaft 7 of an electric motor 8.

The treated suspension is loaded with the aid of a device 9 including a funnel fastened in the upper part of the casing 1.

The sludge is unloaded by a device 10 with an unloading hole in the lower part of the casing 1. The centrifugate is unloaded by a device 11 located on the side portion of the casing 1.

The rotor 3 is made in the form of a drum 12 accommodating arc-shaped vanes arranged side by side in a ring with the inlet ends of the vanes located along the circumference.

The vanes 13 are located between the bottom 14, cover 15 and shell 16, the latter being rigidly connected with the bottom 14 of the rotor 3, e.g. by welding.

The side surface of each vane 13 faces the bottom 14 while its other surface faces the cover 15. The vane 13 consists of a fluted body 17 (FIG. 2) with a sieve 18 pressed against it.

The inlet end of each vane 13 comprising the fluted body 17 with the bottom 19 (FIG. 13) is curved in the form of an eye 20 located at the point where the suspension is fed in.

Each vane 13 is slipped by its eye 20 on a pin 21 whose lower end is rigidly fastened to the bottom 14 (FIG. 1) of the rotor 3.

The upper end of each pin 21 passes through a hole in the cover 15 of the rotor 3.

The cover 15 is connected with the bottom 14 of the rotor 3 at the outlet portion of the vanes 13 by rigidly secured pins 22. The upper ends of the pins 22 pass through holes in the cover 15 of the rotor 3 and have screwed-on nuts 23.

The outlet ends of the vanes 13 rest on the shell 16 (FIG. 2) while their outer bottom side rests on the pins 22.

The upward-directed external side of each side wall 24 (FIGS. 4 and 5) and body 17 (FIG. 2) of the vane 13 has at least one side projection 25 (FIGS. 1 and 5) which enters a circular groove 26 (FIG. 1) made in the cover 15 of the rotor 3.

Similar projections 25 are provided on the downward-directed side wall of the body 17 of each vane 13 and fit into a similar circular groove 26 on the bottom 14 of the rotor 3.

If we provide a pair of such projections 25 on each of both side surfaces of the body 17 of the vane 13, it will be necessary to have two circular grooves 26 on the cover 15 and another two on the bottom 14 of the rotor 3, on their surfaces facing each other.

Thus, the pins 21 and 22, the projections 25 and the shell 16 serve as four supports of each vane.

These supports take the pressure of each vane 13 produced during rotation of the rotor 3 and relieve considerably the shell 16 of the rotor 3 of the pressure of the vanes 13.

For distributing the treated suspension among the vanes 13, there is a bowl 27 fastened to the bottom 14 along the axis of the rotor 3.

Figure 3:
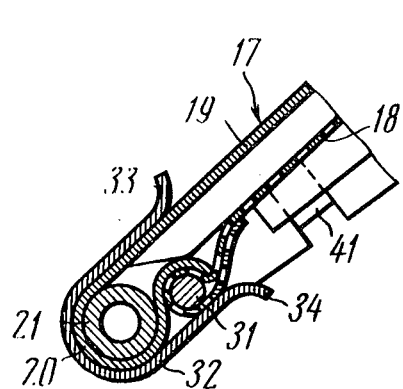
FIG. 3 shows the fastening of the sieve to the eye-shaped end of the vane body by means of a clamp, a section along the longitudinal axis of the vane including the inlet portion of the vane in FIG. 2, enlarged.

Located opposite the outlet end of each vane 13 (FIG. 3) in the shell 16 of the rotor 3 (FIG. 1) are slots 28 arranged along the height of the drum 12, said slots being intended to allow the sludge to escape from the vanes 13 of the rotor 3 and to be subsequently discharge from the centrifuge through the hole 10 in its lower part.

In order to remove the centrifugate from each vane 13, the outlet end of the latter is provided with a pipe connection 29 whose lower end passes through a hole in the bottom 14 of the rotor 3.

The centrifugate flowing out of the pipe connections 29 is collected into a container 30 in the casing 1, said container communicating with the pipe of the device 11 for the discharge of the centrifugate from the centrifuge.

The centrifuge according to the invention is characterized both by a new method of fastening the parts of the vane and by a new design of said parts.

To increase the efficiency of separation of the treated suspension, the sieve 18 (FIG. 2) and the bottom 19 of the fluted body 17 of the vane 13 are curved along a zig-zag line passing in the plane of rotor rotation (FIG. 1).

On the inlet portion of the vane 13 (FIG. 2) the fluted body 17 forms an eye 20 (FIG. 3) whose free end is bent off and forms a hollow receiving the end of the sieve 18 coiled around the pin 31.

The sieve 18 and the pin 31 are held in said hollow along the entire width of the sieve by a flexible clamp 32 in the form of a metal strip whose side ends 33 and 34 are bent in opposite directions and arranged in the plane of the clamp 32.

The end 33 (FIG. 2) of the clamp 32 located on the outer side of the body 17 of the vane 13 is intended to prevent the liquid contained in the suspension from flowing over the outer side of the body 17 and penetrating into the sludge.

The end 34 of the clamp 34 located at the side of the sieve 18 of the vane 13 is intended to distribute the suspension delivered on the vanes 13 uniformly over the entire width of the sieve 18.

The sieve 18 is provided with flat projections 35, 36 and 37 (FIGS. 2, 5 and 6) arranged one after another along the flow of the suspension. Each of the flat projections 35, 36 and 37 extends from one side surface of the sieve 18 to the other.

The flat projections 35, 36 and 37 are aimed to ensure stable movement (without dropping off and jamming) of the suspension and to improve the efficiency of separation.

The flat projection 35 (FIG. 2) is a portion of the sieve 18 bent at an angle.

For treating massecuite the sufficient height of each flat projection varies from 5 to 10 mm.

Figure 2:
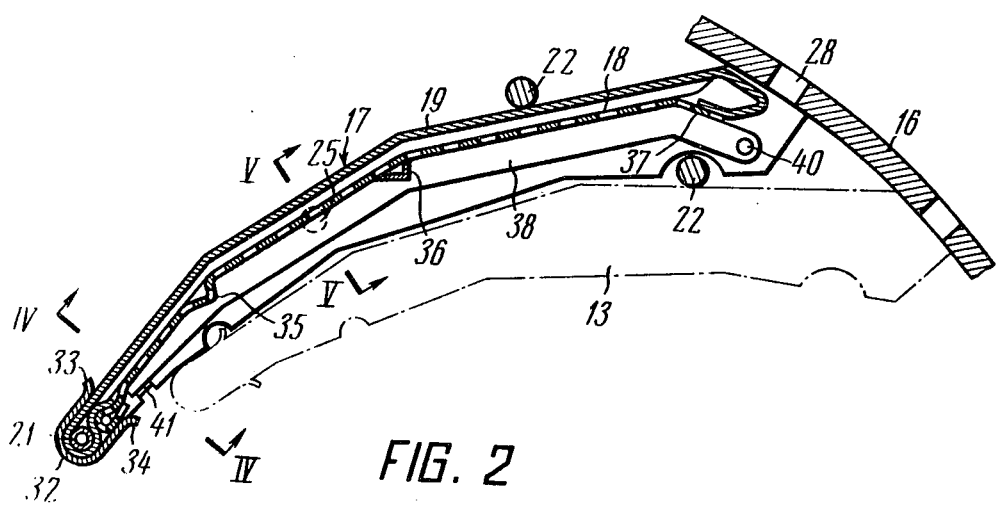
FIG. 2 shows a vane and a part of the shell, a section along the longitudinal axis of the vane; the position of the second vane is shown by a dotted line.
Figure 4:
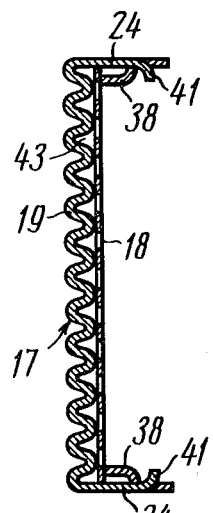
FIG. 4 is a section taken along line IV — IV in FIG. 2 (the entire width of the vane is shown enlarged)
Figure 5:
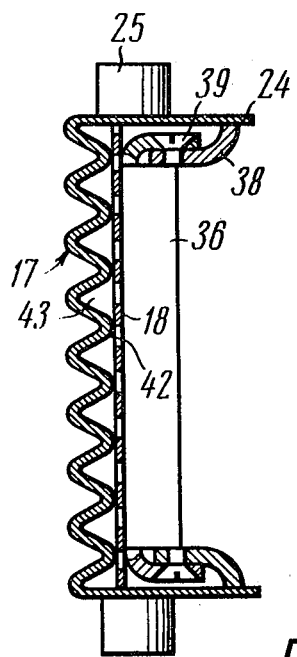
FIG. 5 is a section taken along line V — V in FIG. 2 (the entire width of the vane is shown enlarged)
Figure 6:
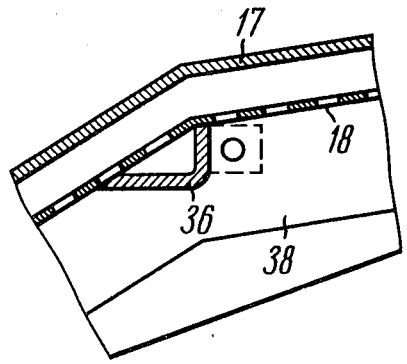
FIG. 6 shows the middle portion of the vane with a flat projection secured to it, a longitudinal section, enlarged.

On the middle portion of the sieve 18 the flat projection 36 (FIG. 6) is made in the form of angles whose ends are pressed along the sides of the sieve 18 by strips 38 (FIGS. 2, 4 and 5). The flat projections 36 are secured to the strips 38 by screws 39 (FIG. 5). The ends of each strip 38 are fastened to the wall 24 of the body 17 by a hinge 40 (FIG. 2) and a catch 41 (FIGS. 2 and 4) which is made on the wall 24 of the body 17 of the vane 13 (FIG. 2).

The flat projection 37 at the outlet end of the vane 13 is formed by the bent edge of the sieve 18.

The bottom 19 (FIG. 2) of the body 17 of the vane 13 is corrugated in order to form projections (ribs) 42 (FIG. 5) in the bottom 19 of the body 17 said projections supporting the sieve 18, and to discharge the separated centrifugate; the corrugations are arranged along the vane 13 so that the sieve 18 is pressed against them during rotation of the rotor 3 (FIG. 1).

The centrifuge for the separation of suspensions functions as follows.

First, the electric motor 8 (FIG. 1) driving the rotor 3 is turned on.

Then the suspension is delivered through the device 9 into the bowl 27 wherefrom the suspension moves onto the inlet ends of the vanes 13. The end 34 (FIGS. 2 and 3) of the clamp 32 distributes the suspension over the entire width of the vertically-arranged working surface of the sieve 18. The end 33 of the clamp 32 prevents the suspension from flowing over the outer surface of the body 17 of the vane 13 and from penetrating into the dehydrated sludge. The suspension enters the beginning of the first straight portion of the sieve 18.

Under the effect of the tangent component of the centrifugal force the layer of suspension moves at a higher speed; then at the end of the straight portion of the zig-zag line its movement is slowed down by the flat projection 35. The nature of movement of the suspension on the following straight portions of the sieve 18 is the same. During accelerated movement of suspension on each straight portion of the zig-zag line the distance between the adjacent solid particles of the suspension increases whereas during the slowed-down movement at the end of each straight portion of the sieve 18 the relative orientation of the solid particles changes. This contributes to a fuller separation of the intercrystalline and film liquid from the treated suspension and, consequently, reduces the moisture content in the sludge.

The flat projections 35, 36 and 37 prevent the non-treated suspension from dropping off the vane 13. As the suspension moves over said flat projections, its solid particles turn in the field of centrifugal forces thereby improving the separation of film liquid from solid particles.

The centrifugate separated from the suspension flows through channels 43 and pipe connections 29 (FIG. 1) into the container 30 where it is discharged from the centrifuge through the device 11. The sludge moves from the vanes 13 and through the slots 28 in the shell 16 from the rotor 3 into the casing 1 and is removed by gravity from the centrifuge through the device 10.

Due to the above-described design of the vanes 13 of the rotor 3, the process of suspension separation becomes stable, without dropping of suspension from the rotor vanes and without jamming on sharp changes of the coefficient of friction between the suspension and sieve 18. Thus, when the coefficient of friction diminishes, the flat projections prevent slipping of the suspension; conversely, when this coefficient increases, the accumulated layer of suspension exerts a pressure which pushes forward the preceding layer.

As the sieve 18 or projections 36 become worn, they can be replaced easily and quickly owing to the quick-disconnect fastening of the strips 38 (FIG. 2) consisting of the hinge 40 and catch 41 (FIG. 4).

The corrugated bottom 19 of the body 17 of the vane 13 is by far lighter than that used at present and requires less metal for its manufacture; besides, the centrifugate separated from the suspension is moved in this bottom through grooves 43 (FIG. 5) under the sieve 18 while the projections 42 of the corrugations serve as supports for the sieve 18.

The projections 25 (FIG. 1) on the outer side surfaces of the body 17 (FIG. 5) entering the circular grooves 26 (FIG. 1) on mutually facing sides of the cover 15 and bottom 14 of the rotor 3 make for convenient disassembly and assembly of the vanes 13 of the rotor 3.

Additional supports in the form of pins 22 (FIG. 2) increase the strength of the vanes 13 and, as a consequence, the reliability of the centrifuge.

The above-mentioned improvements in the parts of the centrifuge rotor varies raise the efficiency of separation of the suspension, speed up and facilitate the replacement of these parts.

Operational tests of the centrifuge on separation of massecuite have shown that the quality of the produced sugar is highly stable, that the centrifuge operates reliably and takes little time for replacing the worn sieves.

We claim:

1. A centrifuge for the separation of suspension comprising: a casing; a drive shaft located in said casing; a rotor mounted on said drive shaft; the bottom of said rotor with holes for the discharge of the centrifugate; the cover of said rotor with a hole for the delivery of suspension; a shell with holes for unloading the sludge; arc-shaped vanes arranged side by side in a ring between said bottom and cover of the rotor and facing them by their side surfaces, the inlet end of each vane being curved into an eye which fits over a pin secured to said bottom and cover of the rotor at the point where the suspension is delivered whereas the outlet end of the vane rests on said rotor shell near the hole for unloading the sludge; a fluted body of each of said vanes; a sieve of each of said vanes, provided with flat projections arranged one after another in the direction of suspension flow and extending from one side of said sieve to the other; strips arranged longitudinally relative to said sieve of the vane and pressing said sieve against said body of the vane.

2. A centrifuge according to claim 1, wherein said flat projections vary in height from 5 to 10 mm.

3. A centrifuge according to claim 1, wherein said flat projections are constituted by the portions of said sieve bent at an angle.

4. A centrifuge according to claim 1, wherein said flat projections located in the middle of said sieve are made in the form of angles whose ends are pressed down on the sides of said sieve by said strips, each strip being fastened to the wall of the body of said vane by a hinge at one end and a catch at the other.

5. A centrifuge according to claim 1, wherein in said vane the sieve is curved in the plane of rotation of said rotor along a zig-zag line and each of said flat projections is located on the route of the suspension flow at the end of the corresponding straight portion of said zig-zag line.

6. A centrifuge according to claim 1, wherein the inlet end of said vane is provided along its entire width with a clamp-shaped metal strip pressing said sieve against said body, the side ends of said strip being bent away from each other in opposite directions and arranged in the plane of said clamp.

7. A centrifuge according to claim 1, wherein in said vane the bottom of the fluted body is corrugated, the corrugations being arranged longitudinally under said sieve.

8. A centrifuge according to claim 7, wherein the external side surface of each wall of the fluted body of said vane is provided with at least one projection while the surfaces of the bottom and cover of said rotor facing each other are provided with a corresponding number of circular grooves for these projections, coaxially with the rotation axis of the rotor.

9. A centrifuge according to claim 8, wherein there is a pin installed at the outer side of the bottom of the body of said vane, close to its outlet portion, the ends of said pin being secured in the bottom and cover of said rotor.

* * * * *